(12) United States Patent
Laumen et al.

(10) Patent No.: US 6,396,423 B1
(45) Date of Patent: May 28, 2002

(54) METHOD FOR CODING OR DECODING AND DEVICE FOR CODING OR DECODING

(75) Inventors: Josef Laumen, Hildesheim; Wael Adi, Braunschweig, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,494

(22) PCT Filed: Aug. 21, 1999

(86) PCT No.: PCT/DE99/02632

§ 371 (c)(1),
(2), (4) Date: Jul. 11, 2001

(87) PCT Pub. No.: WO00/22740

PCT Pub. Date: Apr. 20, 2000

(30) Foreign Application Priority Data

Oct. 12, 1998 (DE) ............................... 198 46 721

(51) Int. Cl.⁷ ............................................. H03M 7/00
(52) U.S. Cl. ........................................................ 341/95

(58) Field of Search .............................. 341/95, 50, 55; 707/1; 375/240.16

(56) References Cited

U.S. PATENT DOCUMENTS 6,192,081 B1 * 2/2001 Chiang et al. ......... 375/240.16

OTHER PUBLICATIONS

*Handbook for Telecommunications, Springer–Verlag, 1998, pp. 1–37.

*Adi, "Fast Burst Error–Correction Scheme with Fire Code," IEEE Transactions on Computers, vol. C–33, No. 7, Jul. 1984.

* cited by examiner

*Primary Examiner*—Brian Young
(74) *Attorney, Agent, or Firm*—Kenyon & Kenyon

(57) ABSTRACT

A device and a method for the coding or decoding of data are provided, in which an outer block coding and an inner coding take place. For adjusting the data rate, the redundancy and therefore the block size of the block-coded data is set.

12 Claims, 3 Drawing Sheets

METHOD FOR CODING OR DECODING AND DEVICE FOR CODING OR DECODING

FIELD OF THE INVENTION

The present invention relates to a method for coding or decoding and a device for coding or decoding.

BACKGROUND INFORMATION

From the Handbook for Telecommunications, Springer Printing House, 1998, pp. 1–37, coding and decoding methods are described in which an outer code and inner code are used. In this context, a block code is proposed as the outer code and a convolutional code is proposed as the inner code. It is also known to adjust the data rate to a preestablished data rate of a transmission channel through the puncturing and/or repeating of selected bits (unequal repetition) of convolutional code.

SUMMARY OF THE INVENTION

In contrast, the methods according to the present invention and the devices according to the present invention have the advantage that adjusting the data rate is accomplished by influencing the block coding. It is possible thus, using simple arrangements to improve error detection and error correction. A fine adjustment of the data rate can especially be achieved through puncturing or repeating/padding a small number of individual bits (only 1 or 2 bits). When there are a plurality of data sources, the signal/noise ratios of the individual data sources can be adjusted to each other by adjusting the block coding, if the data flows of these data sources are transmitted over a single transmission channel in time-division multiplex.

DETAILED DESCRIPTION

Figure 1:
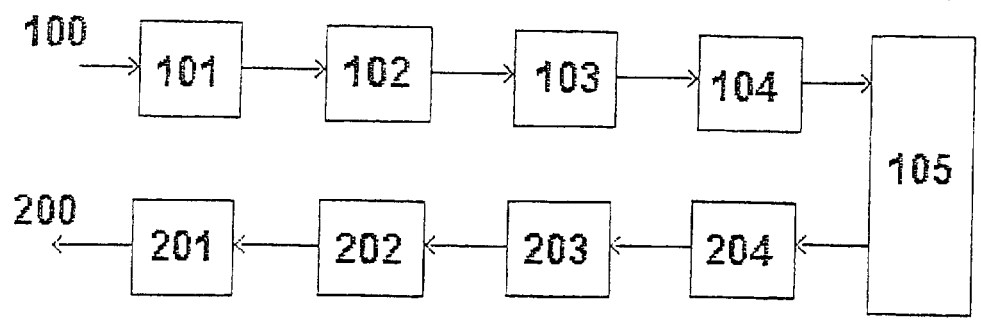
FIG. 1 depicts a conventional method for coding/decoding.

In data transmission systems, due to technical circumstances, it is usual that not every data rate can be realized on the physical channel. Rather, only a few discrete values are permitted for the channel data rate to be transmitted, such as in the UMTS system. In that case, (in single code transmission) channel data rates of 32*2 K kbit/s, k=0 . . . 6 are specified, i.e., the discrete values 32 kbps, 64 kbps, 128 kbps, 256 kbps, 512 kbps, and 1024 kbps. Nevertheless, from the standpoint of a user, information transmission should be supported by UMTS systems at any source data rate. In mobile communication systems, information to be transmitted is especially protected, using channel coding methods, from transmission over the physical channel, in order to assure the most error-free reception possible.

On the receiver side, channel coding methods permit either error correction, error detection, or a combination of the correction and detection of transmission errors. Especially in systems of digital mobile communications, highly developed channel coding methods are used to deal with the difficulties of transmitting digital signals over mobile channels. In other words, a channel coding method of this type is made up of an inner and outer code. The inner coding is usually accomplished using a convolutional code or a turbo code and is usually decoded at the receiver using a Viterbi or a Maximum A Posteriori (MAP) decoder. Typically, decoders are used belonging to both of these types, having the capacity to correct errors although they can neither detect errors nor provide statements concerning the reliability or correctness of the decoded bits. For additional detection of erroneous decisions in the inner decoding device, outer codes on the basis of CRC codes (cyclic redundancy check) or Reed-Solomon codes are used.

Channel coding methods in the contemporary UMTS specification provide for code rates of ½, ⅓, and ¼, when convolutional or turbo codes are used. With respect to the aforementioned discrete channel data rates, this means that only discrete source data rates of approximately Rcode*32*2 k kbit/s are permitted. In the case of a data transmission system without supplemental rate adaptation, e.g., at a code rate rcode=½, only source data rates of roughly 16, 32, 64, 128, 256, or 512 kbps can be permitted.

However, in order to support any source data rates, an adjustment of the data rate (rate matching) of the channel-coded information to the discrete channel data rate is carried out after the channel coding. The algorithm provided for this adaptation of the data rates only provides for the puncturing or repeating of selected bits in the data flow. Puncturing and repeating individual bits are the simplest of all mechanisms for error protection. If bits of a data frame of constant duration are punctured, i.e., deleted and not transmitted, then the data rate on the channel falls, whereas, when bits are repeated, additional replications of these individual selected bits are embedded in the data flow, and thus the effective data rate on the channel is increased, as in FIG. 3. However, both mechanisms only offer quite limited protection against erroneous transmission over the physical channel; in the case of puncturing, the redundancy of the inner code is reduced, i.e., the error protection is also reduced, and in the case of repetition (unequal repetition), the additionally introduced protection does not cover all the bits of a data frame, but rather relates only to individual bits of the frame.

In FIG. 1, a conventional method for adjusting a data rate to a transmission channel 105 is depicted. In function block 101, source data 100 are first subjected to a block coding. This block coding 101 is also termed an outer coding. Usually, for outer block coding 101, a CRC code is used. In a subsequent step 102, subjected to an inner coding, typically a convolutional coding or turbo coding. In a subsequent step 103, an adjustment to the possible data rate of transmission channel 105 takes place. If the data, after channel coding 102, exceed the possible data rate of transmission channel 105, then a puncturing of the convolutional-coded data takes place, so that the data quantity is reduced accordingly. If the data rate after convolutional coding 102 is smaller than the possible data rate on transmission channel 105, then individual bits are repeated, or padding bits are inserted to raise the data rate accordingly. After data rate adjustment 103, there follows an interleaving step 104, in which, as a result of the temporal transposition of the transmission time point of the individual bits, the transmission reliability is further increased. Accordingly, the data are then transmitted over data channel 105 at the prescribed bit rate. The decoding takes place in function blocks 201 through 204. In function block 204, a deinterleaving first takes place, in which the original temporal sequence of the bits is generated once again. In subsequent adaptation step 203, the data rate adaptation of function block 103 is reversed. In the event of puncturing, this takes place by inserting bits having no information content; in the case of repetition, this takes place by eliminating individual bits or by combining a plurality of bits into one single bit. In subsequent function block 202, the inner decoding takes place (convolutional or turbo decoding) and in subsequent step 201, the block decoding. If serious transmission disturbances have not arisen, decoded data 200 should then correspond to original source data 100.

The individual coding and decoding mechanisms differ with respect to their functions. The block codes are typically only used for error detection and provide an indicator of the integrity/reliability of the received data. The inner code (convolutional code or turbo code), on the other hand, is a means that is suited to correct transmission errors, although it only permits to a limited extent (or not all) a statement as to whether the decoded data are reliable or not.

The present invention improves the overall error protection of a transmission system in accordance with FIG. 1, in that the rate matching is carried out by a code of variable block length. For this purpose, the structure of the transmission system is altered in accordance with FIG. 2. Adjusting the source data rate to the permitted transmission data rate is carried out using a combination that comprises elements depicted in FIG. 1, for error protection (inner and outer coding), and an additional (simple) error protection device, on the basis of a variable block code. In contrast to the system depicted in FIG. 1, this doubled error protection (see FIG. 2), composed of inner and outer channel coding methods, offers the following advantage: the error protection which is carried out for the purpose of adjusting the data rate extends over the totality of all bits of a data frame and is not limited to individual selected bits in the data flow. Therefore, it exceeds the error protection properties of the system depicted in FIG. 1 and improves the bandwidth efficiency and/or capacity of the channel of a data transmission system (at least in mobile radio systems). When error protection is improved, it is precisely in mobile radio systems that the transmission capacity of a signal can be reduced at the air interface without influencing the quality of reception. This makes it possible for an operator of mobile radio networks to increase the number of users on the network, i.e., the (channel) capacity of the mobile radio network.

Figure 2:
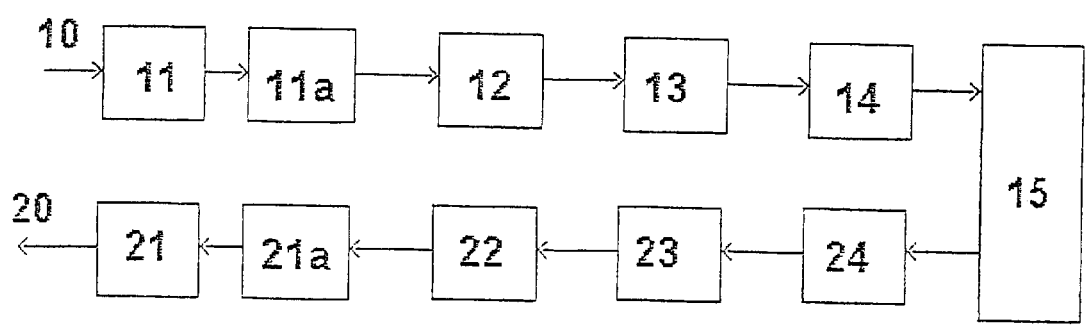
FIG. 2 depicts the method according to the present invention for coding/decoding.

As can be seen in FIG. 2, the original block of rate matching is replaced by a very simple correction unit, and the proposed variable block code is used in place of the original outer (usually CRC) code. The CRC codes are only used for detecting erroneous decisions of the inner decoder in order to detect data frames that have been erroneously decoded, and to be able to mark them as such. On the other hand, when variable block codes are used, both their error correction as well as error detection properties can be exploited. As long as the redundancy added by a variable block code does not contain fewer bits than the redundancy of the CRC code depicted in FIG. 1, the variable block code offers at least the equivalent error protection possibilities. If the redundancy in FIG. 2 exceeds the CRC redundancy in FIG. 1, then either the reliability of the error detection can be further increased, or an additional error correction can be made available. In the publication, "Fast Burst Error-Correction Scheme with Fire Code, Wael Adi, IEEE Transactions on Computers, Volume c-33, No. 7, July 1984," a method for block coding is described which makes possible a flexible balancing between error detection and error correction. In this context, the possibilities of error detection can be flexibly increased and monitored at the cost of decreasing correction capacity, without changing the coding or decoding mechanisms, and vice versa. Thanks to the minimal complexity of implementing variable block codes, the overall complexity of the transmission system is thus reduced.

The method according to the present invention is depicted in FIG. 2. Source data 10 are first subjected to an outer block coding 11. In contrast to FIG. 1, however, here the level of added redundancy and therefore the size of the emitted data block can be adjusted. At issue is a block coding having variable redundancy and block size. In this context, the variation of redundancy and thus o f block size is selected as a function of the subsequent coding steps, so that the most precise possible adjustment takes place of the data rate to transmission channel 15. In a subsequent function block 12, an inner coding takes place, e.g., using a convolutional code or a turbo code. Coders 12 of this type usually have transmission rates of ½, ⅓, ¼, etc., i.e., from one input bit, two output bits, or three or four output bits, are generated. The coded bit rate coming from inner coder 12 is thus always double, triple, or quadruple the data rate made available by block coder 11. By adjusting the data rate of block code 11, it is possible, at a precision of one bit (½ convolutional coding), two bits (⅓ convolutional coding), or three bits (¼ convolutional coding), to adjust the data rate to the data rate of transmission channel 15. Therefore, a fine adjustment 13 is provided which is correspondingly capable of undertaking a fine adjustment in the order of magnitude of one, two, or three bits in accordance with the selected data rate of inner coder 12. Thus, using fine adjustment 13, a bit-precise adjustment of the data rate to the data rate of transmission channel 15 takes place. Between fine adjustment 13 and data channel 15, an interleaver 14 is also provided, which in a known manner brings about an interleaving of the data. Optionally, an additional interleaving 11a can be provided between blocks 11 and 12 in order to further increase the error protection properties of block code 11. This interleaving typically extends over a plurality of blocks of code 11.

The data is decoded in accordance with function blocks 21 through 24. In function block 24, which contains the data transmitted over channel 15, first a deinterleaving takes place, i.e., the original sequence of the channel-coded data is once again generated. In step 23, a fine adjustment of the data rate then takes place, i.e., if individual bits (1, 2, 3, etc.) are added or have been removed by puncturing, then the corresponding bits are once again removed or added. In subsequent function block 22, the inner decoding takes place, which is usually a convolutional or turbo decoding. In subsequent function block 21, the block decoding takes place so as to once again obtain original data 20, which then are made available to a data sink. If optional interleaving 11a has been carried out, then optional deinterleaving 21a is also carried out to sort the data once again in the corresponding temporal sequence.

Of course, between the transmitter and the receiver a message is exchanged as to how the coding was carried out and how correspondingly, the decoding should look. For example, if one specific method is always used for the inner coding, then it is communicated as to which block coding is used in function block 11.

Figure 3:
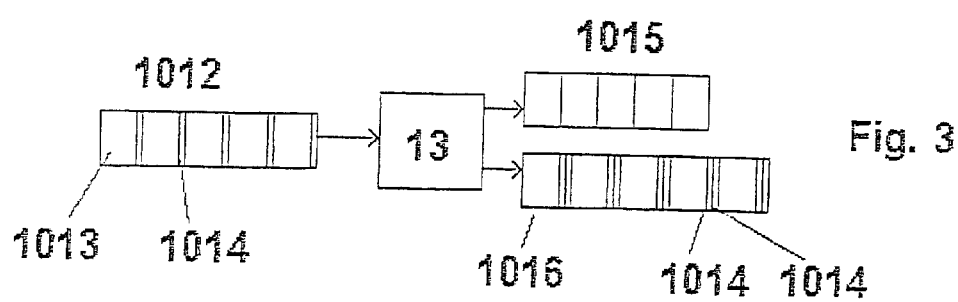
FIG. 3 depicts the fine adjustment of the data rate.

In FIG. 3, the fine adjustment of the data rate to the transmission channel is described.

Here, function block 13 is supplied with exemplary data 1012. To explain the mode of functioning of the fine adjustment, individual frames are depicted that are each made up of 9 bits 1013 and one separately designated individual bit 1014. For purposes of fine adjustment, fine adjustment unit 13 can influence this separately designated bit 1014. In the upper function path, a shortened data line 1015 is created by omitting bit 1014 (puncturing, if the duration of the transmission of one data frame remains constant, then the data rate therefore falls). In the lower part of the drawing, an alternative is depicted in which a lengthened bit stream 1016 is created by doubling bit 1014 (unequal repetition; if the duration of the transmission of one data frame remains constant, then the data rate increases). Using this method, a fine adjustment of the data rate to transmission channel 15 is carried out.

One example: information is to be transmitted at a source data rate of 8 kbit/s over a conventional UMTS system, the error correction to be assured by a convolutional code (inner code) at the rate $1/3$, and the residual error detection to be realized using an outer CRC code having 8 bits redundancy. According to the UMTS specifications, the source data flow is subdivided into data frames having a length of 10 ms, i.e., on every frame, 80 information bits are dropped. For the residual error detection, these 80 bits are CRC coded and are also provided with 8 bits redundancy. These 88 bits have appended to them an additional 8 tail bits, in order, when one data block has been coded, to reset the convolutional coder at the zero state and therefore to permit the most reliable possible operation of the receiver-side Viterbi decoder. Using the convolutional code (rate $1/3$), these 96 bits are coded into 288 bits, i.e., the data rate of the coded bits is 28.8 kbit/s. This rate is far removed from the nearest permitted channel data rates (16 kbps or 32 kbps); a rate adjustment is performed to the nearest rate, i.e., to a channel data rate of 32 kbit/s (320 bits over 10 ms). In accordance with the description in "UMTS (xx.04) V0.5.0, UTRA FDD, multiplexing, channel coding, and interleaving description," every ninth bit is repeated in order to pad the 10-ms-long frame to 320 bits. The additional error protection therefore is extended by bit repetition mainly to every 288/9=32 bits, which are actually repeated. In contrast, an adjustment of the data rate in accordance with the present invention would result in increased error protection for all bits of a frame. In order also to map the information bits to be transmitted onto the same channel data rate of 32 kbit/s, the 80 bits of a frame first have added to them, using the VRC code, 19 bits redundancy. These 99 bits also have added to them 8 tail bits (see above). The convolutional coding (rate $1/3$) thereupon results in 3*107=321 bits per frame of duration 10 ms. This number is already very close to the permitted frame structure of 320 bits per frame. Only one bit from each data frame at 321 bits is now punctured in a simple correction unit, in order to correspond to the 32 kbit/s. This correction unit (block 13 in FIG. 2) is situated between two blocks 12 and 14 and preferably operates on bits that correspond to the previously added VRC redundancy. This correction unit is always operating on the basis of the puncturing/repeating of only zero, one, or a maximum of two bits (only at a rate $1/4$ of the channel code).

In the existing system according to "UMTS (xx.04) V0.5.0, UTRA FDD, multiplexing, channel coding, and interleaving description," only 8 bits CRC are added for error detection, whereas according to the present invention, in this example, 19 bits of VRC redundancy are added. The 11 added bits can be used to improve the possibilities of error detection of the system and/or to make it possible to correct erroneous decisions of the inner (Viterbi) decoder.

Figure 4:
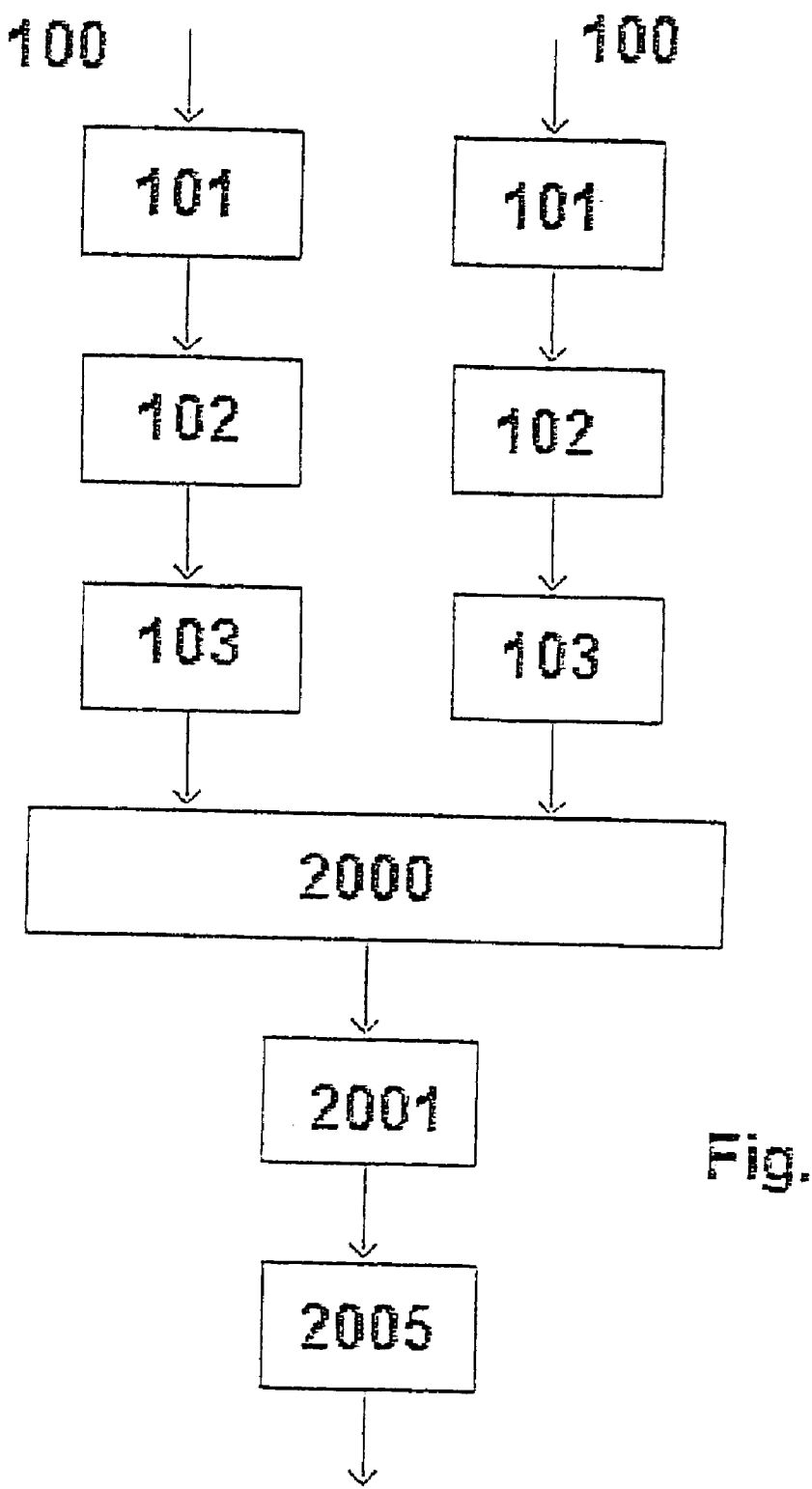
FIG. 4 depicts a conventional method for setting the signal/noise ratio given a plurality of data sources.

Further adjustments of data rates are performed if data from a plurality of sources is to be transmitted having different requirements. This is depicted in FIG. 4. In FIG. 4, two source data flows 100 are depicted that are coded using a first (outer) block coding 101 and a subsequent inner coding 102. In a subsequent processing block 103, an adjustment of the data rate takes place. However, in FIG. 4, this adjustment of the data rate is not carried out for the purpose of undertaking a final adjustment to the transmission channel, but rather with the goal of balancing the signal/noise ratio of the two data sources. This is justified by the fact that for source data 100 from different data sources different requirements exist with respect to transmission quality, i.e., with respect to the signal/noise ratio. It would be possible to satisfy the different quality requirements by adjusting the transmission capacity, i.e., the energy with which the signal is emitted to the data channel, is accordingly adjusted for each of these data sources. However, if a plurality of data flows having different quality requirements are to be transmitted over one and the same transmission channel, then this method is usually not applicable. An alternative method lies in the fact that correspondingly more redundancy is provided in coding for data that are to be transmitted having a higher quality. This takes place in rate adjustment 103, in which, depending on the quality with which the data are to be transmitted, correspondingly more redundancy information is provided. For example, if the adjustment takes place by a repetition of individual bits of convolutional-coded data of coder 102, then it could be provided for the one data flow that every 10th bit is repeated, whereas for the other data flow having higher quality requirements it is provided that every fifth bit is repeated. The output signals of rate adjustment blocks 103, their data rates adjusted accordingly, are fed to a multiplexer 2000, which combines the two data flows into one serial data flow. In this context, a corresponding interleaving of the two data flows can of course take place. In subsequent function block 2001, an adjustment to the current transmission capacity of corresponding data channel 2005 then takes place.

Figure 5:
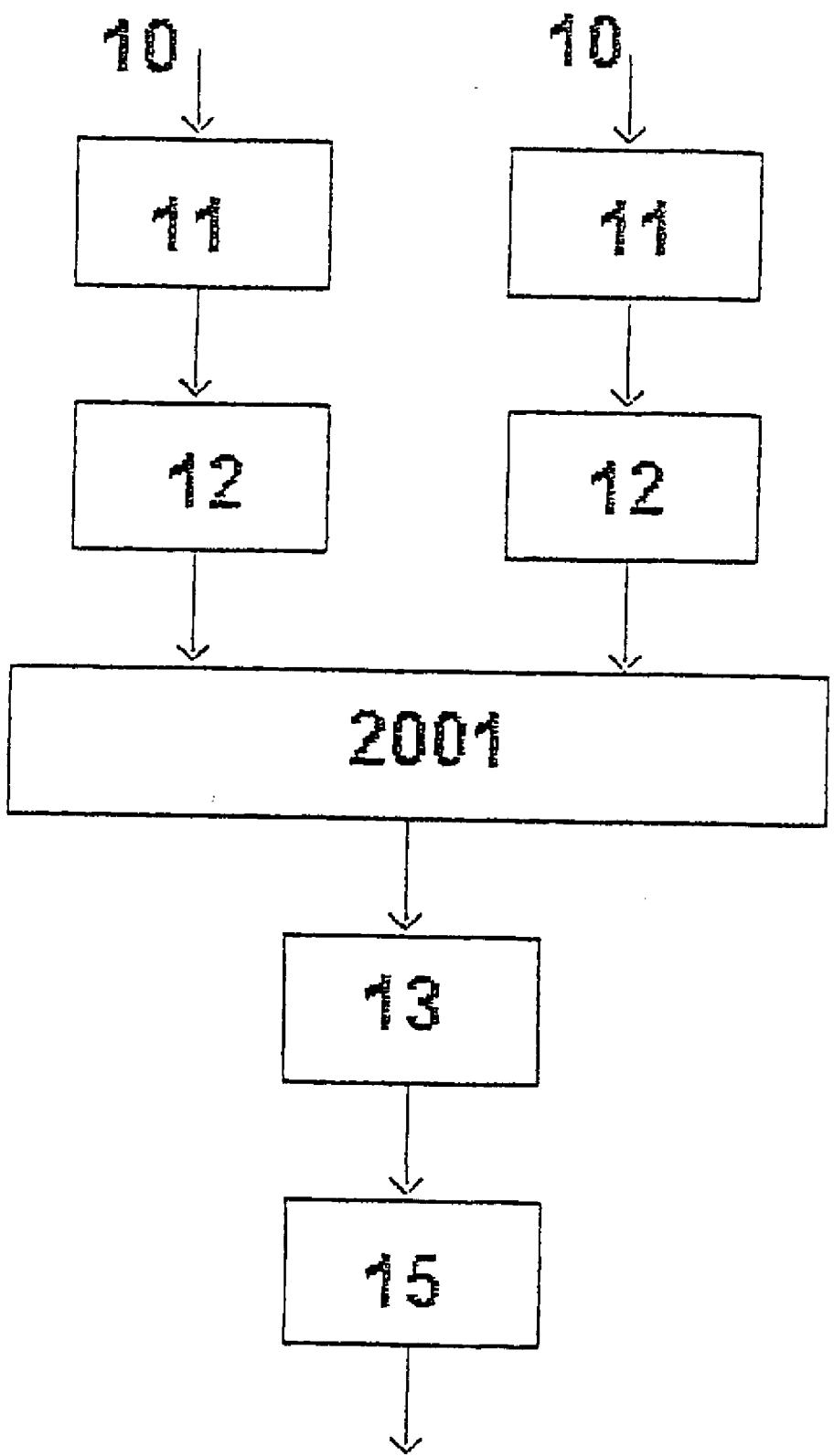
FIG. 5 depicts the method according to the present invention for setting the signal/noise ratio given a plurality of data sources.

In FIG. 5, a method according to the present invention for adjusting the signal/noise ratio of source data from different data sources is depicted. In FIG. 5, two source data flows 10 are shown, which are first coded using an outer block coding 11. In this context, depending on how the signal/noise ratio is to be set for the corresponding data sources, a greater or lesser number of bits is provided. Thus, for example, it can be provided that for the one data flow (depicted in the Figure on the left) for every 10 bits only one redundant bit is provided, whereas in the second data flow (depicted in the Figure on the right) for every 10 bits of the source data three redundant bits are provided. In accordance with the additional redundant bits provided, the signal/noise ratio of the second data flow is thus improved. In subsequent inner coding step 12, a second coding takes place, for example, using a convolutional or turbo coder. The two data flows, processed in this manner, are then combined by a multiplexer 2001 into one serial data flow, the data flows, in this context, being able to be interleaved accordingly. In subsequent function block 13, one more fine adjustment takes place to the data rate of transmission channel 15. If, for the redundancy of the bits added to both blocks 11, optimization has been carried out regarding the source data rate of both data flows 10 and regarding the code rate of both coders 12, then for the fine adjustment only 1,2, etc., bits are accordingly required.

What is claimed is:

1. A method for performing a coding of source data, comprising the steps of:

performing a block coding step;

performing a downstream inner coding step, wherein:
during the block coding step, in order to adjust a data rate to a preestablished data rate of a transmission channel, a level of an added redundancy and therefore of a block size of block-coded data is selected in awareness of a subsequent coding via the downstream inner coding step, such that the most precise possible adjustment of the data rate to the transmission channel occurs; and selecting a code of variable block length for the adjustment of the data rate, wherein:
an error protection introduced to adjust the data rate extends over an entirety of all bits of a data frame.

2. The method according to claim 1, wherein:
the step of performing the downstream inner coding step includes performing one of a convolutional coding step and a turbo coding step.

3. The method according to claim 1, further comprising the steps of:
assigning a fine adjustment step for the adjustment of the data rate to the transmission channel to the downstream inner coding step; and
determining a number of bits capable of being corrected by the fine adjustment step by a code rate corresponding to a ratio of input bits to output bits of the downstream inner coding step.

4. The method according to claim 3, further comprising the step of:
puncturing individual bits in the fine adjustment step.

5. The method according to claim 3, further comprising the step of:
adding individual bits in the fine adjustment step.

6. The method according to claim 1, further comprising the step of:
performing at least one further block coding step in order to code further source data, such that in setting the added redundancy and therefore the block size of the block-coded data of the block coding step and of the at least one further block coding step, in addition, a desired signal/noise ratio of the source data is also taken into account.

7. The method according to claim 5, further comprising the steps of:
before a performance of the downstream inner coding step, adding bits not having a meaningful content; and
puncturing the bits not having a meaningful content in a puncturing process.

8. The method according to claim 7, wherein:
the bits not having a meaningful content include zero bits.

9. The method according to claim 5, further comprising the step of:
during the step of adding the individual bits, repeating those bits that were added in the block coding step.

10. A method for decoding coded data, comprising the steps of:
performing an outer block decoding step; and
performing a downstream decoding step, wherein the coded data are coded in accordance with the steps of:
performing a block coding step;
performing a downstream inner coding step, wherein:
during the block coding step, in order to adjust a data rate to a preestablished data rate of a transmission channel, a level of an added redundancy and therefore of a block size of block-coded data is selected in awareness of a subsequent coding via the downstream inner coding step, such that the most precise possible adjustment of the data rate to the transmission channel occurs; and selecting a code of variable block length for the adjustment of the data rate, wherein:
an error protection introduced to adjust the data rate extends over an entirety of all bits of a data frame.

11. The method according to claim 10, further comprising the step of:
performing a deinterleaving step in order to generate again an original sequence of the coded data.

12. The method according to claim 10, further comprising the step of:
performing a fine adjustment step in which corresponding removed bits are once again added and added bits are once again removed.

* * * * *